US012664685B2

(12) United States Patent
Kappi

(10) Patent No.: US 12,664,685 B2
(45) Date of Patent: Jun. 23, 2026

(54) METHOD, APPARATUS, AND COMPUTER PROGRAM PRODUCT FOR CALIBRATION OF CAMERA TO VEHICLE ALIGNMENT

(71) Applicant: HERE GLOBAL B.V., Eindhoven (NL)

(72) Inventor: Jani Kappi, Tampere (FI)

(73) Assignee: HERE GLOBAL B.V, Eindhoven (NL)

( * ) Notice: Subject to any disclaimer, the term of this patent is extended or adjusted under 35 U.S.C. 154(b) by 321 days.

(21) Appl. No.: 18/459,705

(22) Filed: Sep. 1, 2023

(65) Prior Publication Data

US 2025/0078318 A1      Mar. 6, 2025

(51) Int. Cl.
*G06T 7/80* (2017.01)
*B60W 60/00* (2020.01)
*G06T 7/70* (2017.01)

(52) U.S. Cl.
CPC .............. *G06T 7/80* (2017.01); *B60W 60/00* (2020.02); *G06T 7/70* (2017.01); *B60W 2420/403* (2013.01); *G06T 2207/30252* (2013.01)

(58) Field of Classification Search
CPC ... G06T 7/80; G06T 7/70; G06T 2207/30244; B60W 60/00; G06V 20/56
See application file for complete search history.

(56) References Cited

U.S. PATENT DOCUMENTS 9,491,450 B2    11/2016    Kussel
10,997,737 B2    5/2021    Geva et al.
(Continued)

FOREIGN PATENT DOCUMENTS

CN    114049402 B  *  7/2024    .........  G01C 21/3837
EP    3815045 A1    5/2021
(Continued)

OTHER PUBLICATIONS

M. Fleps, E. Mair, O. Ruepp, M. Suppa and D. Burschka, "Optimization based IMU camera calibration," 2011 IEEE/RSJ International Conference on Intelligent Robots and Systems, San Francisco, CA, USA, 2011, pp. 3297-3304, doi: 10.1109/IROS.2011.6095067. (Year: 2011).*

(Continued)

*Primary Examiner* — Stephen R Koziol
*Assistant Examiner* — Ashley Hytrek
(74) *Attorney, Agent, or Firm* — Michael Yu; HERE GLOBAL B.V

(57) ABSTRACT

A method is provided calibration of alignment between a vehicle and a camera of the vehicle. Methods may include: receiving location information associated with a vehicle; receive measurement data from an inertial measurement unit associated with the vehicle; calculating, from the measurement data and the location information, a position of the inertial measurement unit relative to the vehicle; receiving a first image and a second image from a camera associated with the vehicle; calculating a position of the camera based, at least in part, on the first image and the second image; calculating, from the measurement data and the position of the camera, a position of the inertial measurement unit relative to the camera; and determining alignment of the camera with the vehicle based on the position of the inertial measurement unit relative to the vehicle and the position of the inertial measurement unit relative to the camera.

20 Claims, 4 Drawing Sheets

(56) References Cited

U.S. PATENT DOCUMENTS

| | | | |
|---|---|---|---|
| 2014/0184799 A1* | 7/2014 | Kussel ................. | H04N 17/002 |
| | | | 348/148 |
| 2014/0267690 A1* | 9/2014 | Morin .................... | G01C 11/00 |
| | | | 348/113 |
| 2018/0188032 A1* | 7/2018 | Ramanandan .......... | G01S 19/52 |
| 2020/0271755 A1* | 8/2020 | Wodrich ............... | G01S 7/4008 |
| 2020/0275033 A1* | 8/2020 | Petniunas ............ | H04N 13/246 |
| 2020/0349723 A1* | 11/2020 | Geva ...................... | G06V 20/56 |
| 2020/0353878 A1* | 11/2020 | Briggs .................. | G01C 21/20 |

FOREIGN PATENT DOCUMENTS

| | | |
|---|---|---|
| EP | 2972482 B1 | 8/2021 |
| WO | WO 2020/006378 A1 | 1/2020 |
| WO | WO-2023186428 A1 * 10/2023 .............. G06T 7/80 |

OTHER PUBLICATIONS

Andert, Franz, and Luis Mejias. "Improving monocular SLAM with altimeter hints for fixed-wing aircraft navigation and emergency landing." In 2015 International Conference on Unmanned Aircraft Systems (ICUAS), pp. 1008-1016. IEEE, 2015. (Year: 2015).*

Liu, Zhenbo, Naser El-Sheimy, Chunyang Yu, and Yongyuan Qin. "Motion constraints and vanishing point aided land vehicle navigation." micromachines 9, No. 5 (2018): 249. (Year: 2018).*

Andert et al., "Improving monocular slam with altimeter hints for fixed-wing aircraft navigation and emergency landing", Proceedings of the 2015 International Conference on Unmanned Aircraft Systems, ICUAS, Institute of Electrical and Electronics Engineers Inc., (2015), 10 pages.

* cited by examiner

300

305

305

305

305

310

315

320

330

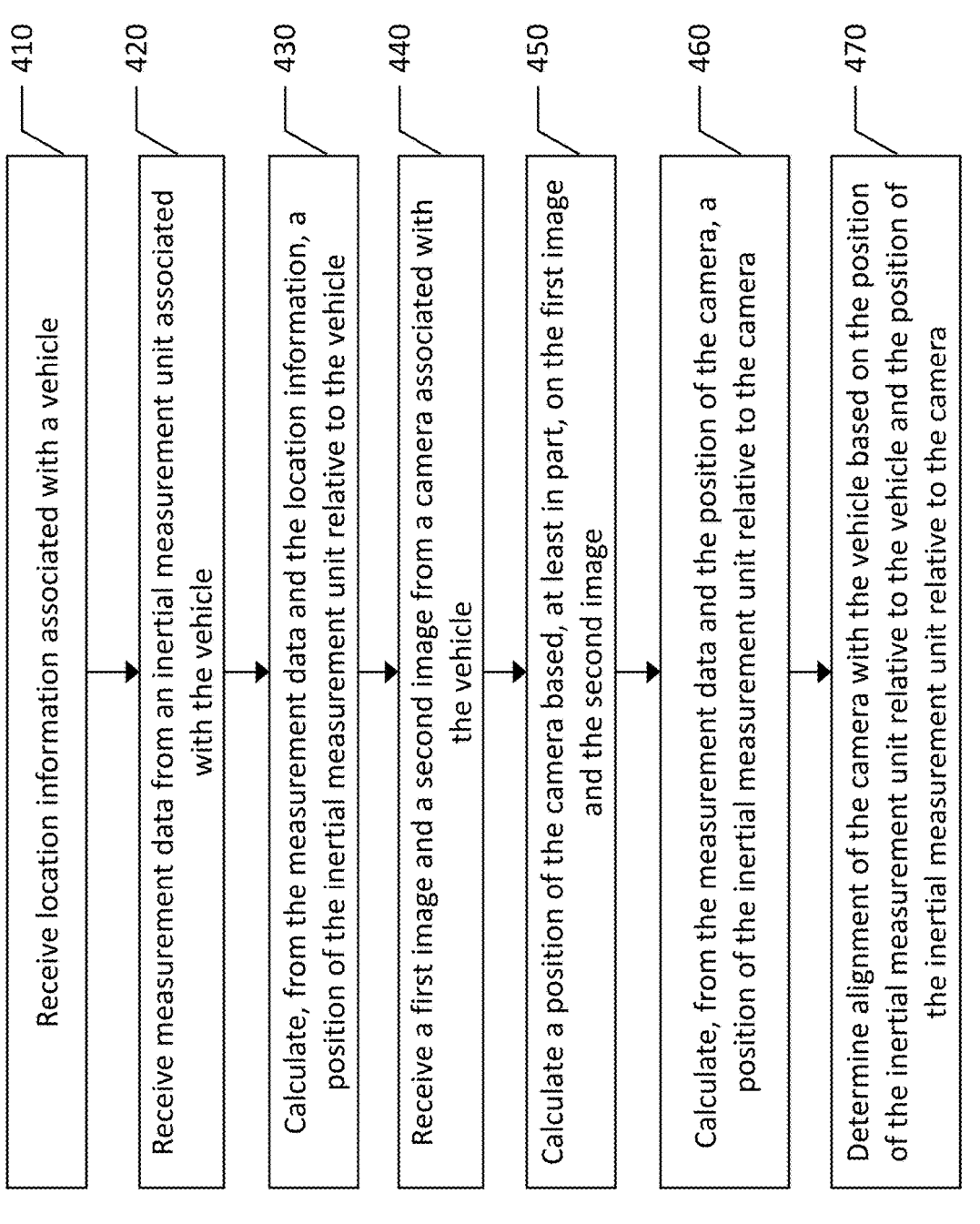

410 — Receive location information associated with a vehicle

420 — Receive measurement data from an inertial measurement unit associated with the vehicle 430 — Calculate, from the measurement data and the location information, a position of the inertial measurement unit relative to the vehicle 440 — Receive a first image and a second image from a camera associated with the vehicle 450 — Calculate a position of the camera based, at least in part, on the first image and the second image 460 — Calculate, from the measurement data and the position of the camera, a position of the inertial measurement unit relative to the camera 470 — Determine alignment of the camera with the vehicle based on the position of the inertial measurement unit relative to the vehicle and the position of the inertial measurement unit relative to the camera

FIG. 4

METHOD, APPARATUS, AND COMPUTER PROGRAM PRODUCT FOR CALIBRATION OF CAMERA TO VEHICLE ALIGNMENT

TECHNOLOGICAL FIELD

An example embodiment of the present disclosure relates to camera alignment calibration, and more particularly, to solve camera to vehicle alignment without a calibration target during normal vehicle operation.

BACKGROUND

Vehicle operation has generally involved a human operator controlling the movement of the vehicle, including acceleration, braking, and steering among other vehicle functions. As technology has advanced, some features and functions of vehicles have become automated. Cruise control is an early example of a feature that automated vehicle operation of maintaining a near-constant speed. Cruise control is relatively simple to implement, particularly by today's standards, as the system requires at minimum a sensor to determine a real-time speed and a mechanism by which the throttle is opened for acceleration. Later embodiments of cruise control implemented transmission gear changes to employ engine braking to reduce speeds, such as when descending a hill. More recently, cruise control has become substantially more capable as "adaptive cruise control", including being able to accelerate, brake, and even bring a vehicle to a stop. Such control requires an array of sensors and actuators to implement.

Adaptive cruise control represents semi-autonomous vehicle control; however, technology has advanced to the point of fully autonomous vehicles, and various levels of partial autonomy. Fully autonomous vehicle control eliminates the need for a human operator, and relegates all vehicle control functions to computer-based controllers. Given the complexity in controlling a vehicle within an environment having dynamic objects such as other vehicles proximate the vehicle, even vehicles with a moderate degree of autonomy require highly capable sensor suites. Ensuring these sensor suites are operating properly is imperative to maintaining safe autonomous vehicle control.

BRIEF SUMMARY

A method, apparatus, and computer program product are provided in accordance with an example embodiment for camera alignment calibration, and more particularly, to solve camera to vehicle alignment without a calibration target during normal vehicle operation. Embodiments provided herein include an apparatus having at least one processor and at least one memory including computer program code with the at least one memory and computer program code being configured to, with the processor, cause the apparatus to: receive location information associated with a vehicle; receive measurement data from an inertial measurement unit associated with the vehicle; calculate, from the measurement data and the location information, a position of the inertial measurement unit relative to the vehicle; receive a first image and a second image from a camera associated with the vehicle; calculate a position of the camera based, at least in part, on the first image and the second image; calculate, from the measurement data and the position of the camera, a position of the inertial measurement unit relative to the camera; and determine alignment of the camera with the vehicle based on the position of the inertial measurement unit relative to the vehicle and the position of the inertial measurement unit relative to the camera.

The apparatus of an example embodiment is further caused to provide at least partial autonomous control of the vehicle based, at least in part, on the alignment of the camera with the vehicle. According to some embodiments, the first image is captured at a first location of the vehicle, the second image is captured at a second location of the vehicle, where the first location is different than the second location. According to some embodiments, the first image has a first field-of-view, the second image has a second field-of-view, and the first field-of-view at least partially overlaps with the second field-of-view.

According to some embodiments, causing the apparatus to calculate the position of the camera based, at least in part, on the first image and the second image includes causing the apparatus to employ stereoscopic localization to calculate the position. The location information associated with the vehicle includes, in some embodiments, information obtained from a global navigation satellite system. According to certain embodiments, causing the apparatus to calculate, from the measurement data and the position of the camera, the position of the inertial measurement unit relative to the camera includes causing the apparatus to perform a reprojection error calculation to obtain the position of the inertial measurement unit relative to the camera.

Embodiments provided herein include a computer program product including at least one non-transitory computer-readable storage medium having computer-executable program code instructions stored therein, the computer-executable program code instructions including program code instructions to: receive location information associated with a vehicle; receive measurement data from an inertial measurement unit associated with the vehicle; calculate, from the measurement data and the location information, a position of the inertial measurement unit relative to the vehicle; receive a first image and a second image from a camera associated with the vehicle; calculate a position of the camera based, at least in part, on the first image and the second image; calculate, from the measurement data and the position of the camera, a position of the inertial measurement unit relative to the camera; and determine alignment of the camera with the vehicle based on the position of the inertial measurement unit relative to the vehicle and the position of the inertial measurement unit relative to the camera.

The computer program product of an example embodiment further includes program code instructions to provide at least partial autonomous control of the vehicle based, at least in part, on the alignment of the camera with the vehicle. According to some embodiments, the first image is captured at a first location of the vehicle, the second image is captured at a second location of the vehicle, where the first location is different than the second location. According to some embodiments, the first image has a first field-of-view, the second image has a second field-of-view, and the first field-of-view at least partially overlaps with the second field-of-view.

According to some embodiments, the program code instructions to calculate the position of the camera based, at least in part, on the first image and the second image include program code instructions to employ stereoscopic localization to calculate the position. The location information associated with the vehicle includes, in some embodiments, information obtained from a global navigation satellite system. According to certain embodiments, the program code instructions to calculate, from the measurement data and the position of the camera, the position of the inertial measurement unit relative to the camera include program code instructions to perform a reprojection error calculation to obtain the position of the inertial measurement unit relative to the camera.

Embodiments provided herein include a method including: receiving location information associated with a vehicle; receive measurement data from an inertial measurement unit associated with the vehicle; calculating, from the measurement data and the location information, a position of the inertial measurement unit relative to the vehicle; receiving a first image and a second image from a camera associated with the vehicle; calculating a position of the camera based, at least in part, on the first image and the second image; calculating, from the measurement data and the position of the camera, a position of the inertial measurement unit relative to the camera; and determining alignment of the camera with the vehicle based on the position of the inertial measurement unit relative to the vehicle and the position of the inertial measurement unit relative to the camera.

The method of an example embodiment further includes providing at least partial autonomous control of the vehicle based, at least in part, on the alignment of the camera with the vehicle. According to some embodiments, the first image is captured at a first location of the vehicle, the second image is captured at a second location of the vehicle, where the first location is different than the second location. According to some embodiments, the first image has a first field-of-view, the second image has a second field-of-view, and the first field-of-view at least partially overlaps with the second field-of-view.

According to some embodiments, calculating the position of the camera based, at least in part, on the first image and the second image includes employing stereoscopic localization to calculate the position. The location information associated with the vehicle includes, in some embodiments, information obtained from a global navigation satellite system. According to certain embodiments, calculating, from the measurement data and the position of the camera, the position of the inertial measurement unit relative to the camera includes performing a reprojection error calculation to obtain the position of the inertial measurement unit relative to the camera.

Embodiments provided herein include an apparatus including: means for receiving location information associated with a vehicle; means for receive measurement data from an inertial measurement unit associated with the vehicle; means for calculating, from the measurement data and the location information, a position of the inertial measurement unit relative to the vehicle; means for receiving a first image and a second image from a camera associated with the vehicle; means for calculating a position of the camera based, at least in part, on the first image and the second image; means for calculating, from the measurement data and the position of the camera, a position of the inertial measurement unit relative to the camera; and means for determining alignment of the camera with the vehicle based on the position of the inertial measurement unit relative to the vehicle and the position of the inertial measurement unit relative to the camera.

The apparatus of an example embodiment further includes means for providing at least partial autonomous control of the vehicle based, at least in part, on the alignment of the camera with the vehicle. According to some embodiments, the first image is captured at a first location of the vehicle, the second image is captured at a second location of the vehicle, where the first location is different than the second location. According to some embodiments, the first image has a first field-of-view, the second image has a second field-of-view, and the first field-of-view at least partially overlaps with the second field-of-view.

According to some embodiments, the means for calculating the position of the camera based, at least in part, on the first image and the second image includes means for employing stereoscopic localization to calculate the position. The location information associated with the vehicle includes, in some embodiments, information obtained from a global navigation satellite system. According to certain embodiments, the means for calculating, from the measurement data and the position of the camera, the position of the inertial measurement unit relative to the camera includes means for performing a reprojection error calculation to obtain the position of the inertial measurement unit relative to the camera.

BRIEF DESCRIPTION OF THE DRAWINGS

Figure 1:
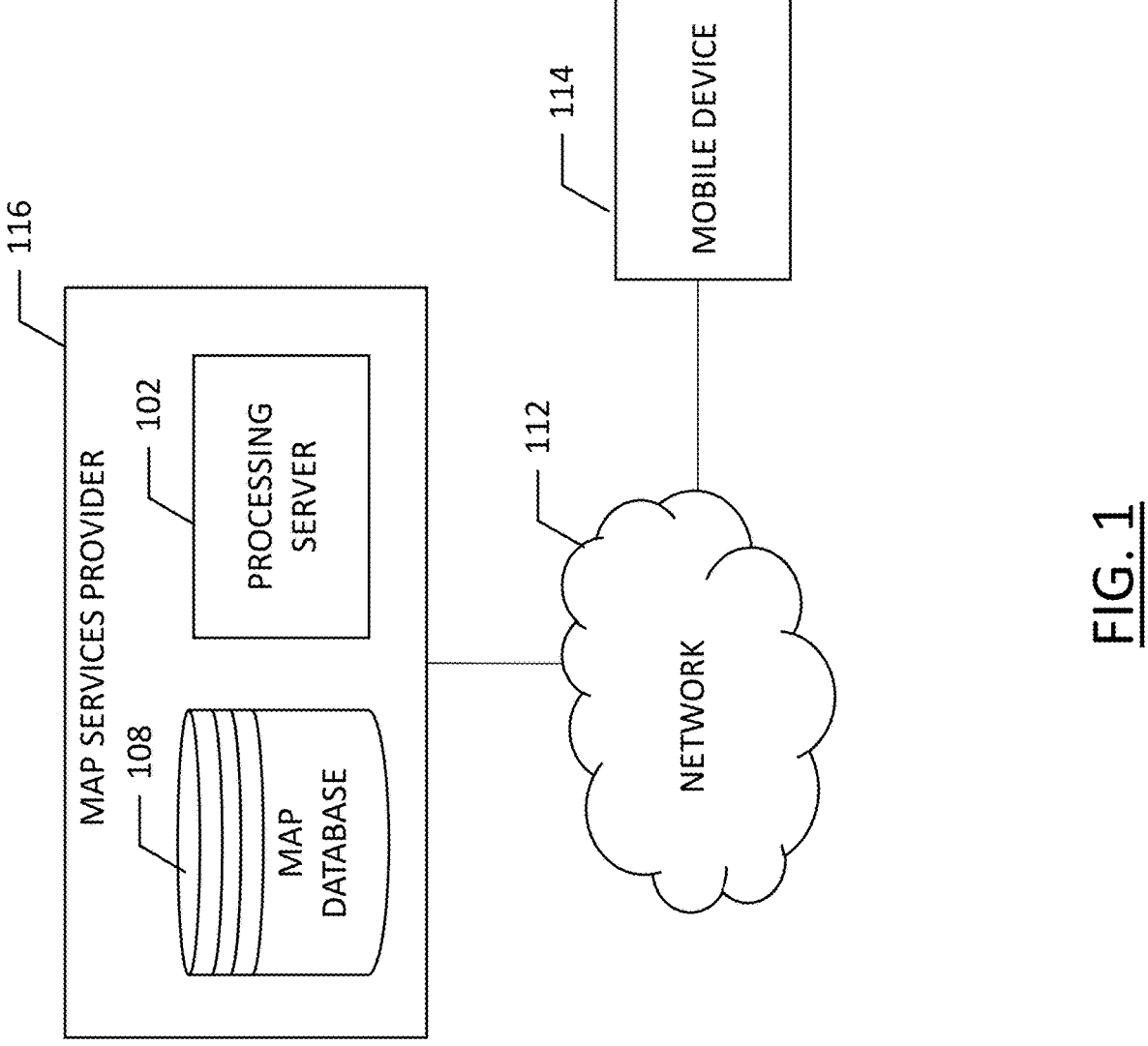
Figure 2:
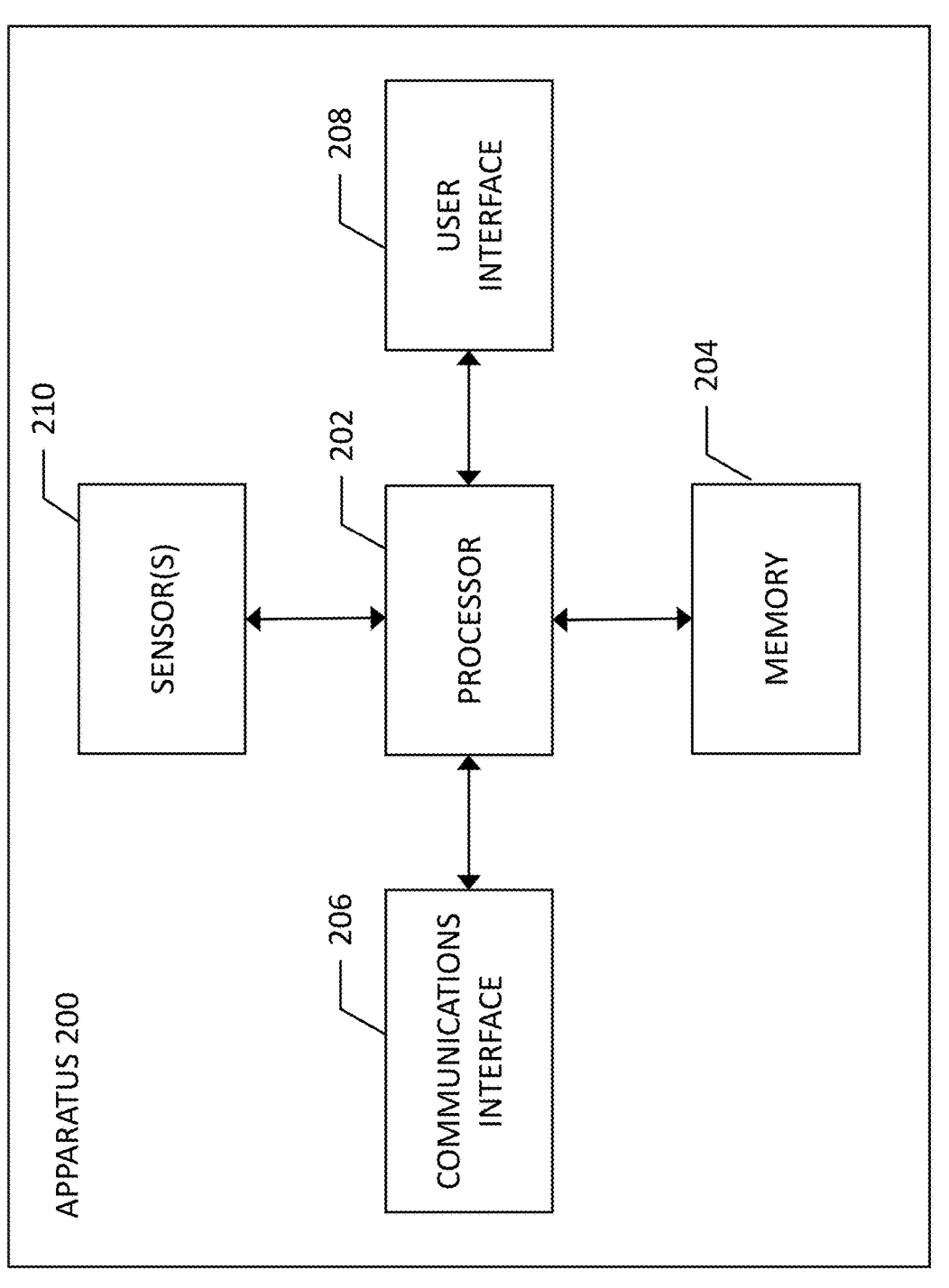
Figure 3:
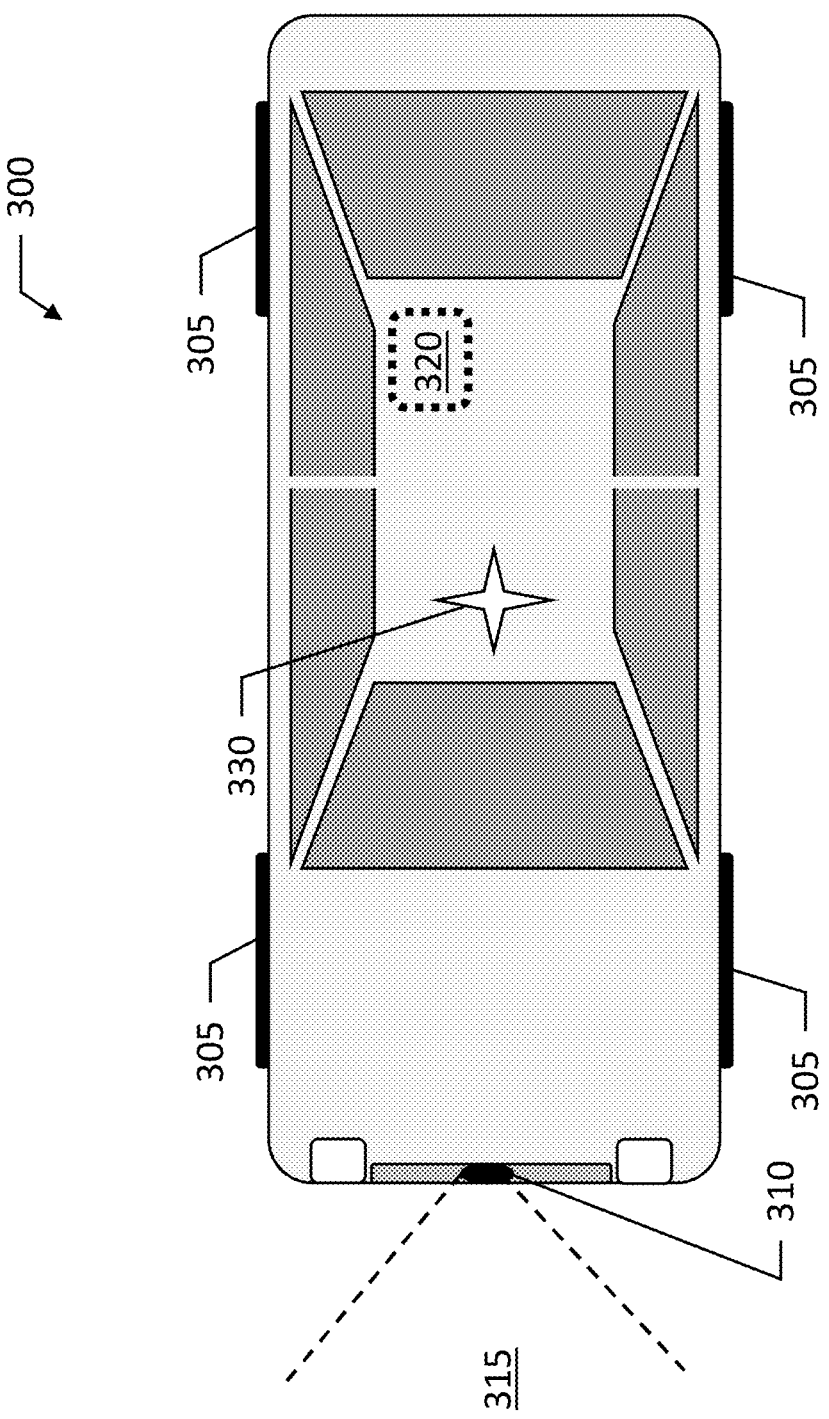

Having thus described example embodiments of the disclosure in general terms, reference will now be made to the accompanying drawings, which are not necessarily drawn to scale, and wherein:

FIG. 1 illustrates a communication diagram of a system for implementing example embodiments described herein according to an example embodiment of the present disclosure;

FIG. 2 is a block diagram of an apparatus for calibration of camera to vehicle alignment according to an example embodiment of the present disclosure;

FIG. 3 illustrates a simplified diagram of a vehicle having a camera and an inertial measurement unit according to an example embodiment of the present disclosure; and FIG. 4 is a flowchart of a method of determining camera to vehicle alignment according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for camera alignment calibration, and more particularly, to solve camera to vehicle alignment without a calibration target during normal vehicle operation. Vehicles, and particularly vehicles with some degree of autonomy, generally employ at least one camera to facilitate some autonomous functionality. These cameras or image sensors can be used for object detection, localization (visual positioning), map generation, map healing, etc. The images captured by the cameras require some localization of the camera itself in order for the images to have proper context and to be useful. Further, understanding the camera position relative to a vehicle associated with the camera is necessary to understand the position of objects within the images relative to the vehicle. As such, camera to vehicle alignment is imperative for proper functionality of the aforementioned purposes. Further, this position requires calibration to improve the accuracy of the image-based solutions for which the camera is used.

Camera alignment calibration is critical to vision-based solutions for object detection and visual positioning. The camera parameters, including the intrinsic parameters and extrinsic parameters, are needed to resolve pixel-to-world mapping. The camera manufacturer generally provides the intrinsic parameters associated with a camera, thereby providing camera-to-image transformation. The intrinsic parameters can also be estimated offline prior to runtime operation. The calibration process typically includes a calibration target (e.g., checkerboard) that allows estimation of the camera-to-image mapping. The intrinsic parameters typically do not change and can generally be used for the lifetime of the camera without recalibration.

The extrinsic parameters provide world-to-camera mapping. In a vehicle mounted embodiment, this generally refers to camera-to-vehicle frame transformation. The calibration process for extrinsic parameters requires precision calibration target setup and vehicle alignment, and can be both time consuming and costly. The extrinsic parameter calibration process is usually done offline and does not support runtime (targetless) calibration. If the camera alignment changes during operation, such as due to vibration, the solution performance will degrade as the camera pose estimates no longer match the vehicle motion and pose.

Embodiments provided herein provide calibration of extrinsic parameters to solve camera-to-vehicle alignment without requiring a calibration target in a process that is both accurate and efficient. Further, the calibration process of example embodiments can be run real-time during normal vehicle operation, improving vehicle safety and reliability. Embodiments include two phases to accomplish the calibration. The first phase uses IMU (Inertial Measurement Unit) measurements to solve IMU-to-vehicle alignment. This process uses vehicle motion constraints to calculate the IMU-to-vehicle alignment as part of the INS (Inertial Navigation System) filtering solution. The INS system employs Global Navigation Satellite Systems (GNSS) or similar external systems as a reference. The second phase of the calibration uses reprojection error to solve the IMU-to-camera alignment. The INS solution is used as a baseline and the method uses two images as a stereo pair. A non-linear cost function can be applied to remove outliers. Having both the vehicle and the camera aligned with respect to the IMU enables alignment between the vehicle and camera using the IMU as a common reference point.

As noted above, alignment of the camera to the vehicle is important for a variety of functions, not least of which is autonomous vehicle control. Accurately identifying the presence of objects in an environment within images captured by the camera, and understanding the position of those objects relative to a vehicle associated with the camera, is imperative for object avoidance and guidance using objects as visual markers of the environment. The objects identified in images may be objects stored in map data, such as in high-definition (HD) map data. During autonomous vehicle operation, the understanding of object location relative to the vehicle in real-time is important for safe and efficient autonomous vehicle control. Thus, alignment of the camera capturing the images in which objects are detected relative to the associated vehicle needs to be accurate. Calibration of this camera-to-vehicle alignment "on-the-fly" or as a vehicle travels within an environment provides the opportunity to verify or validate calibration regularly providing the most accurate alignment possible.

FIG. 1 illustrates a communication diagram of an example embodiment of a system for implementing example embodiments described herein. Particularly, the illustrated embodiment of FIG. 1 depicts the system that may be used to facilitate autonomous vehicle control that is made possible through the accuracy and efficiency of the calibration process described herein. The illustrated embodiment of FIG. 1 includes a map services provider system 116, a processing server 102 in data communication with a geographic map database, e.g., map database 108 through a network 112, and one or more mobile devices 114. The mobile device 114 may be associated, coupled, or otherwise integrated with a vehicle, such as an advanced driver assistance system (ADAS), for example. The ADAS can be a system employed by an autonomous vehicle for autonomous control, and can include, for example, the camera or input from the camera and control the vehicle based, at least in part, on the image data from the camera with a thorough understanding of the alignment between the camera and the vehicle. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as object detection, adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. This data can include objects along roadways, such as continuous objects (e.g., lane lines, curbing, guard rails, etc.) and discrete objects (e.g., signs, poles, etc.). Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems.

In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Such sensor data from vehicles can Also, remote sensing, such as aerial or satellite photography, can be used to generate map geometries directly or through machine learning as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, restoring, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 4, may be specifically configured in accordance with an example embodiment of the present disclosure for revising map geometry based on a detailed analysis of probe data and existing map geometry. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Embodiments described herein can further employ a processer embodied by a Graphics Processing Unit (GPU) specifically configured for neural network implementations and/or image processing capitalizing on efficient processing capabilities using multiple parallel operations As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The apparatus 200 of an example embodiment can include one or more sensor(s) 210, which can include, for example, image sensors (e.g., cameras), LiDAR sensors, radar, and/or various other sensors that identify environmental conditions or conditions of a vehicle. In the case of embodiments described herein, the sensor(s) 210 can include one or more cameras while the apparatus 200 is embodied by a vehicle controller or ADAS, for example.

As described generally above, embodiments described herein enable calibration of alignment between a camera and a vehicle associated with the camera. This is performed through calibration of alignment of the camera to an IMU, and calibration of alignment of the vehicle to the IMU, and coupling those calibrations together to achieve camera-to-vehicle alignment calibration. The first phase of embodiments described herein includes use of IMU measurements to solve alignment of the IMU to the vehicle. The IMU senses movement through use of internal sensors, such as gyroscopes, magnetometers, etc. and constrains the vehicle motion to calculate IMU to vehicle alignment as part of the INS filtering solution. The INS system uses GNSS or other localization techniques (e.g., cellular signal triangulation, access point communication fingerprinting, etc.) as a reference for the location of the movement of the IMS. The second phase of embodiments described herein is the use of reprojection error to solve for IMU to camera alignment. The INS solution is employed as a baseline, and the algorithm of example embodiment uses two images captured by the camera as a stereo pair. Localization can be performed via the stereo pair. A nonlinear cost function can remove outliers to reduce processing load and increase efficiency.

Embodiments combine the first phase and the second phase to obtain camera-to-vehicle alignment, which can be performed in real-time during normal vehicle operation.

Embodiments of the process described herein can run at regular intervals (e.g. a matter of seconds or minutes), or run substantially continuously, with new pairs of images of the stereo pair included to the estimation set dynamically. Substantially continuously is used herein to describe a process that can be run essentially continuously, while allowing for buffering with a buffering limit to address processing and memory constraints. The alignment determination between the vehicle and the camera can employ spline fitting or similar algorithms with a nonlinear cost function to reduce the effects of noisy input data and to remove outliers. The INS solution can also use other sensors in addition to the IMU, such as an odometer, LiDAR, and radar.

Embodiments provided herein presume that the intrinsic parameters of the camera are known. However, it is possible to extend embodiments described herein to further estimate the intrinsic parameters during the process if the intrinsic parameters are not known, or if they are uncertain. Estimation of the intrinsic parameters of the camera requires knowledge of the environment and information of the detected, visible objects. This data can include map data (e.g., HD map data as described above) from a map services provider, and may include information such as lane information, traffic sign information, road objects and their associated geometries, etc. The process can then be adjusted to use geometries of the known objects to determine both intrinsic and extrinsic parameters.

According to an example embodiment in which the camera-to-vehicle calibration is already performed, embodiments described herein can be used as a failsafe solution to provide visibility and metrics that allow monitoring of the calibration status. This can identify when alignment changes, or is drifting away from a factory setting, for example. This monitoring can be part of a vehicle safety solution.

Highly autonomous vehicles rely upon cameras to understand their environment and to safely and efficiently navigate within an environment. To do this, the environment must be very well understood including having an understanding of the position of objects within the environment, what type of objects they are, and how those objects are to be used in establishing a safe path for the vehicle. In understanding the location and position of these objects, the location and position is identified within images captured by the camera. This enables localization of the objects relative to the location of the camera and the field-of-view of the camera. However, without an accurate understanding of the camera position and field-of-view relative to the vehicle, accurate localization of the objects relative to the location and position of the vehicle is not possible.

FIG. 3 illustrates an example embodiment of a vehicle 300 including a camera 310 and a general location of an inertial measurement unit 320. The camera has a field of view 315 defined by the dashed lines. The camera 310 has a position relative to the vehicle 300, at a front end of the vehicle. The inertial measurement unit 320 has a location relative to the vehicle proximate a back of the vehicle. During autonomous vehicle control, the position of the vehicle 300 within the environment is critical for proper and safe navigation within the environment. As such, understanding the dimensions of the vehicle, the position of the wheels 305 of the vehicle, and knowing where the front, back, and sides of the vehicle are positioned is important. The camera 310 is used to help identify a path within the environment, but must understand the position of the camera relative to the vehicle 300. This enables the autonomous control logic to understand where the extremities of the vehicle are relative to the camera.

The camera 310 can be calibrated to a particular position relative to the vehicle 300, such as using a calibration targets in a controlled environment. This may be performed during manufacture or at specific service intervals. However, the camera can become misaligned through various actions, such as when a minor accident occurs, an object impacts the vehicle proximate the camera during a drive, the vehicle loses factory settings during a power outage, etc. As such, calibration of the position of the camera relative to the vehicle in real-time or near real-time is desirable to maintain alignment and to confirm alignment is accurate.

Embodiments described herein solve the problem of camera to vehicle alignment without requiring a calibration target and process. The inertial measurement unit 320 can collect data as the vehicle travels within an environment. The measurement data from the inertial measurement unit 320 can be used to calculate alignment between the inertial measurement unit 320 and the vehicle 300 as part of an inertial navigation system filtering solution. The inertial navigation system can use global navigation satellite systems (GNSS) or similar external systems as reference. The inertial measurement unit 320 position relative to the vehicle can be solved relative to a specific location on the vehicle, such as a center point 330 or centroid of the vehicle. The vehicle dimensions are fixed relative to this center point 330 such that when the location of the center point 330 is known along with a heading of the vehicle, the position of the extremities and the wheels of the vehicle are similarly known.

The inertial measurement unit 320 to camera 310 alignment can be performed, such as using reprojection error. The inertial navigation system solution of an example embodiment is used as a baseline and two images from the camera are used as a stereo pair. Based on the two images, reprojection error can be used to identify a difference between a measured point and a projected point, thereby providing an indication of how accurately features are detected in the images and how accurately three-dimensional coordinates can be projected. A non-linear cost function can be applied to remove outliers. Once the inertial measurement unit 320 is aligned with the vehicle center point 330 and the camera 310 is aligned with the inertial measurement unit, these two relative positions can be leveraged to identify the camera 310 to vehicle 300 alignment (e.g., the camera 310 to center point 330). This can be determined in real time during normal operation of the vehicle.

FIG. 4 illustrates a flowchart depicting methods according to an example embodiment of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

An operation of an example apparatus will herein be described with reference to the flow chart of FIG. 4. The illustrated method may be performed, for example, by apparatus 200 using processor 202 with program code instructions stored in memory 204 to cause the apparatus to perform the operations of the method of FIG. 4. As shown, apparatus is caused to receive location information associated with a vehicle at 410. This information can be based, for example, on GPS or other localization means. At 420, measurement data is received from an inertial measurement unit associated with the vehicle. Using the measurement data and the location information, a position of the inertial measurement unit relative to the vehicle is calculated at 430. A first image and a second image are received from a camera associated with the vehicle at 440. A position of the camera is calculated at 450 based, at least in part, on the first image and the second image. A position of the inertial measurement unit relative to the camera is calculated at 460 from the measurement data and the position of the camera. Alignment of the camera with the vehicle is determined at 470 based on the position of the inertial measurement unit relative to the vehicle and the position of the inertial measurement unit relative to the camera.

In an example embodiment, an apparatus for performing the methods of FIG. 4 above may include a processor (e.g., the processor 202) configured to perform some or each of the operations (410-470) described above. The processor may, for example, be configured to perform the operations (410-470) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-470 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:

receive location information associated with a vehicle;

receive measurement data from an inertial measurement unit associated with the vehicle;

calculate, from the measurement data and the location information, a position of the inertial measurement unit relative to the vehicle;

receive a first image and a second image from a camera associated with the vehicle;

calculate a position of the camera based, at least in part, on the first image and the second image;

calculate, from the measurement data and the position of the camera, a position of the inertial measurement unit relative to the camera via at least one reprojection error calculation; and determine alignment of the camera with the vehicle based on the position of the inertial measurement unit relative to the vehicle and the position of the inertial measurement unit relative to the camera, wherein the determined alignment is based at least in part on a nonlinear cost function.

2. The apparatus of claim 1, wherein the apparatus is further caused to:

provide at least partial autonomous control of the vehicle based, at least in part, on the alignment of the camera with the vehicle.

3. The apparatus of claim 1, wherein the first image is captured at a first location, wherein the second image is captured at a second location, and wherein the vehicle has moved from the first location to the second location.

4. The apparatus of claim 3, wherein the first image has a first field-of-view, wherein the second image has a second field-of-view, and wherein the first field-of-view at least partially overlaps with the second field-of-view.

5. The apparatus of claim 4, wherein causing the apparatus to calculate the position of the camera based, at least in part, on the first image and the second image comprises causing the apparatus to employ stereoscopic localization to calculate the position.

6. The apparatus of claim 1, wherein the location information associated with the vehicle comprises location information obtained from a global navigation satellite system.

7. The apparatus of claim 1, wherein causing the apparatus to calculate, from the measurement data and the position of the camera, the position of the inertial measurement unit relative to the camera comprises causing the apparatus to:

perform reprojection error calculation to obtain the position of the inertial measurement unit relative to the camera.

8. A computer program product comprising at least one non-transitory computer-readable storage medium having computer-executable program code instructions stored therein, the computer-executable program code instructions comprising program code instructions to:

receive location information associated with a vehicle;

receive measurement data from an inertial measurement unit associated with the vehicle;

calculate, from the measurement data and the location information, a position of the inertial measurement unit relative to the vehicle;

receive a first image and a second image from a camera associated with the vehicle;

calculate a position of the camera based, at least in part, on the first image and the second image;

calculate, from the measurement data and the position of the camera, a position of the inertial measurement unit relative to the camera via at least one reprojection error calculation; and determine alignment of the camera with the vehicle based on the position of the inertial measurement unit relative to the vehicle and the position of the inertial measurement unit relative to the camera, wherein the determined alignment is based at least in part on a nonlinear cost function.

9. The computer program product of claim 8, further comprising program code instructions to:

provide at least partial autonomous control of the vehicle based, at least in part, on the alignment of the camera with the vehicle.

10. The computer program product of claim 8, wherein the first image is captured at a first location, wherein the second image is captured at a second location, and wherein the vehicle has moved from the first location to the second location.

11. The computer program product of claim 10, wherein the first image has a first field-of-view, wherein the second image has a second field-of-view, and wherein the first field-of-view at least partially overlaps with the second field-of-view.

12. The computer program product of claim 11, wherein the program code instructions to calculate the position of the camera based, at least in part, on the first image and the second image comprise program code instructions to employ stereoscopic localization to calculate the position.

13. The computer program product of claim 8, wherein the location information associated with the vehicle comprises location information obtained from a global navigation satellite system.

14. The computer program product of claim 8, wherein the program code instructions to calculate, from the measurement data and the position of the camera, the position of the inertial measurement unit relative to the camera comprise program code instructions to:

perform reprojection error calculation to obtain the position of the inertial measurement unit relative to the camera.

15. A method comprising:

receiving location information associated with a vehicle;

receiving measurement data from an inertial measurement unit associated with the vehicle;

calculating, from the measurement data and the location information, a position of the inertial measurement unit relative to the vehicle;

receiving a first image and a second image from a camera associated with the vehicle;

calculating a position of the camera based, at least in part, on the first image and the second image;

calculating, from the measurement data and the position of the camera, a position of the inertial measurement unit relative to the camera via at least one reprojection error calculation; and determining alignment of the camera with the vehicle based on the position of the inertial measurement unit relative to the vehicle and the position of the inertial measurement unit relative to the camera, wherein the determined alignment is based at least in part on a nonlinear cost function.

16. The method of claim 15, further comprising:
providing at least partial autonomous control of the vehicle based, at least in part, on the alignment of the camera with the vehicle.

17. The method of claim 15, wherein the first image is captured at a first location, wherein the second image is captured at a second location, and wherein the vehicle has moved from the first location to the second location.

18. The method of claim 17, wherein the first image has a first field-of-view, wherein the second image has a second field-of-view, and wherein the first field-of-view at least partially overlaps with the second field-of-view.

19. The method of claim 18, wherein calculating the position of the camera based, at least in part, on the first image and the second image comprises employing stereoscopic localization to calculate the position.

20. The method of claim 15, wherein the determined alignment is also based at least in part on a spline fitting algorithm.

* * * * *